(12) United States Patent
Moore et al.

(10) Patent No.: US 7,305,894 B2
(45) Date of Patent: Dec. 11, 2007

(54) NIP PRESS SENSING SYSTEM INCLUDING A SENSOR STRIP HAVING SENSOR INTERFACE ELECTRONICS ASSOCIATED THEREWITH AND METHODS OF OPERATING THE SAME

(75) Inventors: Robert Hunter Moore, Pittsburgh, PA (US); David Murphy, Titusville, PA (US)

(73) Assignee: Stowe Woodward, L.L.C., Middletown, VA (US)

( * ) Notice: Subject to any disclaimer, the term of this patent is extended or adjusted under 35 U.S.C. 154(b) by 88 days.

(21) Appl. No.: 11/128,642

(22) Filed: May 13, 2005

(65) Prior Publication Data
US 2006/0020418 A1    Jan. 26, 2006

Related U.S. Application Data

(60) Provisional application No. 60/571,174, filed on May 14, 2004.

(51) Int. Cl.
*G01L 5/00* (2006.01)
(52) U.S. Cl. .............. 73/862.55; 73/158; 73/159; 73/160
(58) Field of Classification Search ............ 73/158, 73/159, 160, 862.55
See application file for complete search history.

(56) References Cited

U.S. PATENT DOCUMENTS 3,738,487 A * 6/1973 Way et al. ............. 209/554
4,739,299 A 4/1988 Eventoff ............. 338/99
4,810,992 A 3/1989 Eventoff ............. 338/99
4,963,702 A 10/1990 Yaniger ............. 178/18
5,048,353 A * 9/1991 Justus et al. ............. 73/862.55
5,053,585 A 10/1991 Yaniger ............. 178/18
5,272,324 A 12/1993 Blevins ............. 235/462
5,296,837 A 3/1994 Yaniger ............. 338/47
5,302,936 A 4/1994 Yaniger ............. 338/47
5,365,671 A 11/1994 Yaniger ............. 33/366
5,505,138 A 4/1996 Newcomb et al. ......... 104/111
5,510,783 A 4/1996 Findlater et al. ............. 341/34
5,562,202 A 10/1996 Newcomb et al. ....... 198/861.1
D376,789 S 12/1996 Tickle ............. D14/114
5,589,137 A 12/1996 Markin et al. ............. 422/109
D377,343 S 1/1997 Tickle ............. D14/114

(Continued)

FOREIGN PATENT DOCUMENTS

EP    0 967 470    12/1999

OTHER PUBLICATIONS

International Search Report and Written Opinion of the International Searching Authority for International patent application No. PCT/US2005/016841 mailed on Aug. 30, 2005.

*Primary Examiner*—Edward Lefkowitz
*Assistant Examiner*—Freddie Kirkland, III
(74) *Attorney, Agent, or Firm*—Meyers Bigel Sibley & Sajovec, P.A.

(57) ABSTRACT

According to some embodiments of the present invention, a system for determining characteristics of two rolls configured in a nip press includes a strip configured to be placed in the nip press. A plurality of sensors embedded in the strip is configured to generate signals representative of the pressure and/or the nip width between the two rolls. Interface circuitry facilitates addressing of individual ones of the plurality of sensors via a data processing system.

35 Claims, 4 Drawing Sheets

U.S. PATENT DOCUMENTS

| | | | |
|---|---|---|---|
| 5,659,334 A | 8/1997 | Yaniger et al. | 345/156 |
| 5,670,988 A | 9/1997 | Tickle | 345/157 |
| D390,211 S | 2/1998 | Yates et al. | D14/114 |
| 5,828,363 A | 10/1998 | Yaniger et al. | 345/156 |
| 5,907,419 A | 5/1999 | Martnelli et al. | 359/172 |
| D410,909 S | 6/1999 | Tickle | D14/114 |
| 5,943,044 A | 8/1999 | Martinelli et al. | 345/174 |
| 5,953,230 A * | 9/1999 | Moore | 700/122 |
| 5,982,519 A | 11/1999 | Martnelli et al. | 359/154 |
| 5,996,818 A | 12/1999 | Boje et al. | 211/74 |
| 6,068,437 A | 5/2000 | Boje et al. | 414/331.02 |
| 6,084,572 A | 7/2000 | Yaniger et al. | 345/159 |
| 6,161,759 A | 12/2000 | Moss et al. | 235/462.01 |
| 6,177,050 B1 | 1/2001 | Bybee et al. | 422/65 |
| 6,203,210 B1 | 3/2001 | Mikula et al. | 385/78 |
| 6,205,369 B1 | 3/2001 | Moore | 700/122 |
| 6,225,976 B1 | 5/2001 | Yates et al. | 345/156 |
| 6,239,790 B1 | 5/2001 | Martinelli et al. | 345/174 |
| D448,358 S | 9/2001 | Tickle et al. | D14/218 |
| 6,360,612 B1 | 3/2002 | Trantzas et al. | 73/753 |
| 6,430,459 B1 * | 8/2002 | Moore | 700/122 |

* cited by examiner

NIP PRESS SENSING SYSTEM INCLUDING A SENSOR STRIP HAVING SENSOR INTERFACE ELECTRONICS ASSOCIATED THEREWITH AND METHODS OF OPERATING THE SAME

RELATED APPLICATION

This application claims the benefit of and priority to U.S. Provisional Application No. 60/571,174, filed May 14, 2004, and entitled Nip Width Measurement System, the disclosure of which is hereby incorporated herein by reference.

BACKGROUND OF THE INVENTION

The present invention relates generally to the field of nip press technology and, more particularly, to systems and methods for measuring nip width between loaded rolls in a nip press.

In the process of papermaking, many stages may be required to transform headbox stock into paper. The initial stage is the deposition of the headbox stock onto paper machine clothing or felt. Upon deposition, the white water forming a part of the stock flows through the interstices of the felt, leaving a mixture of water and fiber thereon. The felt then supports the mixture, leading it through several dewatering stages such that only a fibrous web or matt is left thereon.

One of the stages of dewatering takes place in the nip press section of the papermaking process. In the nip press section, two or more cooperating rolls press the fibrous web as it travels on the felt between the rolls. The rolls, in exerting a great force on the felt, cause the web traveling thereon to become flattened, thereby achieving a damp fibrous matt. The damp matt is then led through several vacuum and dewatering stages.

The amount of pressure applied to the web during the nip press stage may be important in achieving uniform sheet characteristics. Variations in nip pressure can affect sheet moisture content and sheet properties. Excessive pressure can cause crushing of fibers as well as holes in the resulting paper product. Conventional methods addressing this problem have been inadequate, and thus, this problem persists in the nip press stage, often resulting in paper of poor quality, having uneven surface characteristics.

Roll deflection, commonly due to sag or nip loading, is a source of uneven pressure distribution. Rolls have been developed which monitor and alter the roll crown to compensate for such deflection. Such rolls usually have a floating shell which surrounds a stationary core. Underneath the floating shell are pressure regulators which detect pressure differentials and provide increased pressure to the floating shell when necessary.

Notwithstanding the problem of roll deflection, the problem of uneven loading across the roll length, and in the cross machine direction, persists because pressure is often unevenly applied along the roll. For example, if roll loading in a roll is set to 200 pounds per inch, it may actually be 300 pounds per inch at the edges and 100 pounds per inch at the center.

Conventional methods for determining a pressure distribution profile for a roll may involve the use of nip width sensors. Nip width measurements may be taken along the length of a roll and then processed to generate a pressure distribution profile. Unfortunately, conventional technology uses spaced sensors configured in such a way that they may not be able to detect certain nip width variations that occur over small spatial dimensions, such as those near the end of a nipped roll or those near regions having high temperatures. For example, the region just outside the sheet edge of calendar covers may be especially important. There is no sheet to insulate the calendar cover from the heated mating roll and the dub has not started to keep the roll materials separated. Thus, the calendar cover in the region just outside the sheet edge may become hot and expand radially due to thermal expansion. This region may have greater nip pressure because it is similar to a localized thicker region. Another example is where local damage or a local hot spot raises the cover.

SUMMARY OF THE INVENTION

According to some embodiments of the present invention, a system for determining characteristics of two rolls configured in a nip press includes a strip configured to be placed in the nip press. A plurality of sensors embedded in the strip is configured to generate signals representative of the pressure and/or the nip width between the two rolls. Interface circuitry facilitates addressing of individual ones of the plurality of sensors via a data processing system.

In other embodiments, the interface circuitry is embedded in the strip.

In other embodiments, the interface circuitry is attached to the strip.

In other embodiments, the plurality of sensors is configured in a plurality of sensor banks. The interface circuitry includes a plurality of multiplexer circuits respectively coupled to the plurality of sensor banks, each of the multiplexer circuits being responsive to a sensor address to select the output signal of one sensor contained on the respective sensor bank coupled thereto.

In other embodiments, a bank selection circuit is coupled to the plurality of multiplexer circuits and is responsive to a multiplexer selection address to selectively enable one of the plurality of multiplexer circuits.

In other embodiments, a plurality of processors is respectively coupled to the plurality of multiplexer circuits and is responsive to a multiplexer selection address to selectively enable one of the plurality of multiplexer circuits.

In still other embodiments, a data processing system is configured to process the signals and calculate values representative of the signals.

In still other embodiments, a display is coupled to the data processing system and is configured to provide a visual representation of the values.

In still other embodiments, the data processing system is configured to calculate measurements of nip width based on the signals.

In still other embodiments, the data processing system is configured to calculate measurements of nip width based on the signals at predetermined times.

In still other embodiments, a wireless transmitter is configured to communicate the signals to the data processing system.

In still other embodiments, a control system is communicatively coupled to the plurality of sensors and is configured to initiate corrective measures for the nip press responsive to the signals.

In still other embodiments, the plurality of sensors embedded in the strip is configured to generate signals that provide a substantially continuous representation of the pressure and/or the nip width along a length of the two rolls.

Although described above primarily with respect to system embodiments of the present invention, it will be understood that the present invention may be embodied as systems, methods, and/or apparatus.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF PREFERRED EMBODIMENTS

Figure 1:
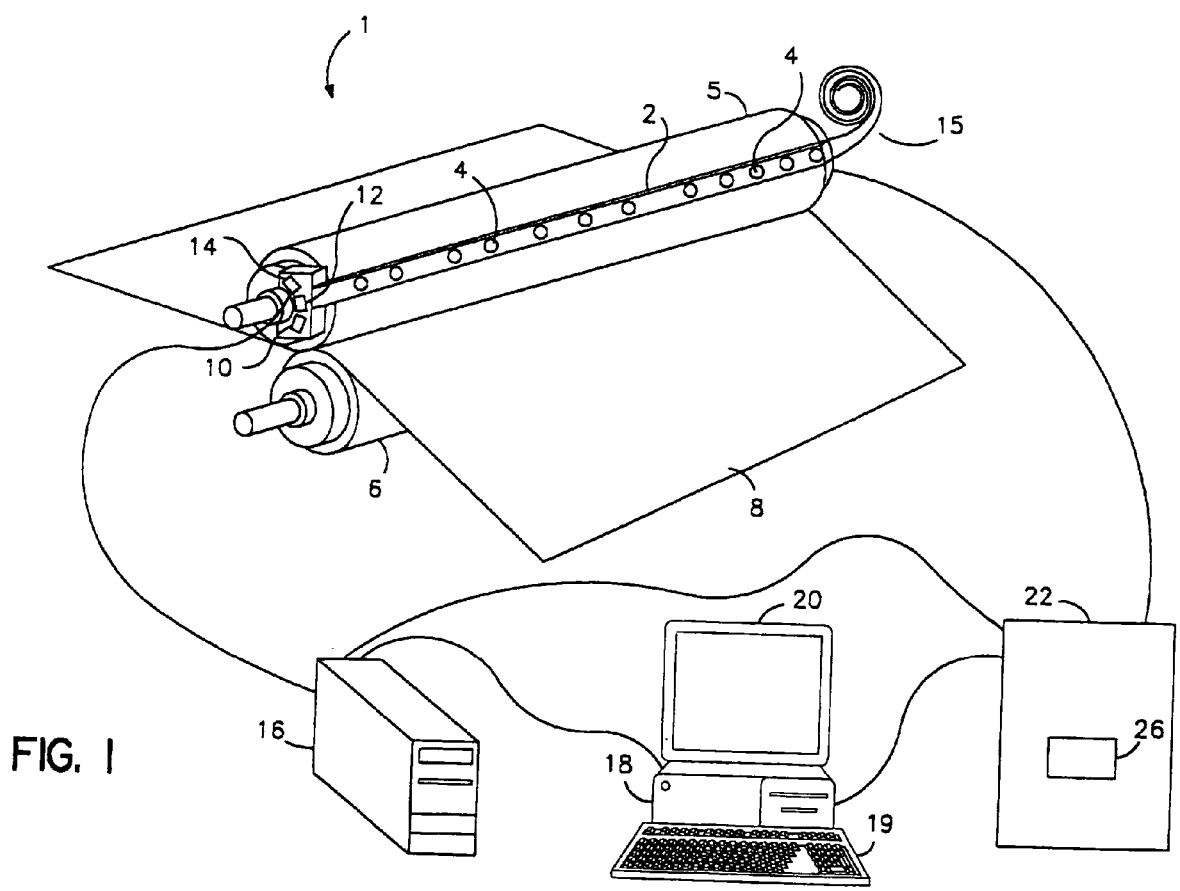
FIG. 1 illustrates a sensing system in accordance with some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 illustrates a sensing system 1, in accordance with some embodiments of the present invention, as it is applied to sense the pressure exerted by rolls 5, 6 in a nip press. In the nip press section of a papermaking machine, rolls 5 and 6 rotatingly squeeze a fibrous web which is carried on the felt 8 disposed therebetween. For the rolls 5, 6 to provide uniform pressure to a fibrous web, they may be evenly loaded and the width of contact between the rolls, i.e. the nip width, may be within a predetermined range.

The sensing system 1 comprises a strip 2, such as an elongated member made of a thin film of material. Sensors 4 are fixed to the strip for sensing pressure/force and/or nip width. The strip 2 having sensors 4 thereon is shown for purposes of illustration as not contacting the felt 8 and roll 6. During system operation, however, the strip 2 may lie in the nip between roll 5 and the felt 8 or directly between rolls 5 and 6. Placement of the strip 2 within the nip may be achieved by removably attaching the strip to roll 5, as shown, and then rotating roll 5 to properly position the strip. Alternatively, the strip may be may be placed directly between rolls 5 and 6 and rolled into the nip by rotating the rolls. The nip formed by rolls 5, 6 may also be opened and the strip placed between the rolls. The nip may then be closed.

The strip 2 having sensors 4 thereon may be rolled into a coil 15 for storage and unrolled during use. According to some embodiments of the present invention, the sensors 4 are spaced on the strip in sufficient numbers so that a substantially continuous distribution of pressure or nip width across the roll may be determined. The sensing system 1 can be used on any length roll, eliminating the need for different length sensing systems for different rolls and/or mills. Also, several strips of sensors may be pieced end-to-end to span the length of very long rolls.

In accordance with various embodiments of the present invention, the sensors 4 may comprise resistive, piezoelectric, piezoresistive, strain gage, and/or fiber optic materials. Also, the sensors may be equipped with temperature measuring sensors to aid in temperature compensation if needed.

In communication with the sensors 4 are associated electronics 10. The electronics 10 connected to the sensors 4 may aid in converting the sensor signals to pressure signals and/or nip width signals by amplifying the signals and/or eliminating external interference. The type of sensor used, however, determines the nature of the associated electronics 10. For example, if piezoelectric or piezoresistive sensors are used, the electronics 10 may comprise charge amplifiers. Alternatively, if strain gage sensors are used, the electronics 10 may comprise wheatstone bridges. If fiber optic materials are used, the electronics may comprise an optical phase modulator.

The electronics 10 are in communication with an input/output port 12, which is accessed by a bidirectional transmitter 14. The computer or data processing system 18 cycles through the sensors 4 to obtain pressure and/or nip width measurement signals from sensor locations along the strip 2 and, thus, along the roll 5 in the nip press. The bidirectional transmitter 14 transmits the signals from the multiplexer input/output port 12 to a signal conditioner 16 which, in turn, delivers conditioned signals representing the pressure and/or nip width sensed to the computer 18.

The sensors and associated electronics may be connected directly to the computer via wire cable. Nonetheless, the signals may be sent via telemetry or through slip rings. The computer 18 has a microprocessor having the ability to access the input/output port 12 at predetermined or requested times to obtain pressure-related and/or nip width-related data. Requested transmissions are achieved by operator input through the keyboard 19 of the computer. Once the computer 18 has indicated to the circuitry on the strip 2 which channels to read, the computer 18 receives the signals from the sensors 4 associated with the channels selectively accessed by the circuitry on the strip 2. Such signals are delivered to the microprocessor which runs a software program to compute a pressure value and/or nip width value. These values may then be transmitted to a display 20, which provides numerical or graphical cross machine pressure profiles and/or nip width profiles.

The computer 18 can further provide averages of the pressure and/or nip width values as well as initiate a correction signal to an optional control system 22. In addition, the computer 18 can determine nip widths indirectly from the pressure sensed and/or the measured sensor resistance through analysis software. The software takes the pressure signals and provides output data relating to nip width. This can also be accomplished through empirical relationships such as the ones used to relate nip width to line load or through experimentally obtained graphs. Various sensor types and their use in determining pressure and/or nip width are discussed in U.S. Pat. No. 6,205,369 to Moore, which is hereby incorporated herein by reference in its entirety.

The control system 22 can be connected to the computer 18 or the signal conditioner 16 to correct any sensed pressure and/or nip width irregularities by increasing or decreasing the force being applied by the roll or by increasing or decreasing the degree of contact between the rolls 5, 6. The control system 22 has an internal computer 26 for receiving user inputs in response to interpretation of pressure and/or nip width sensed or for receiving direct readings from the signal conditioner. The control system's computer 26, upon receipt of such signals, may initiate corrective measures to adjust the force being applied by the roll 2.

Figure 2A:
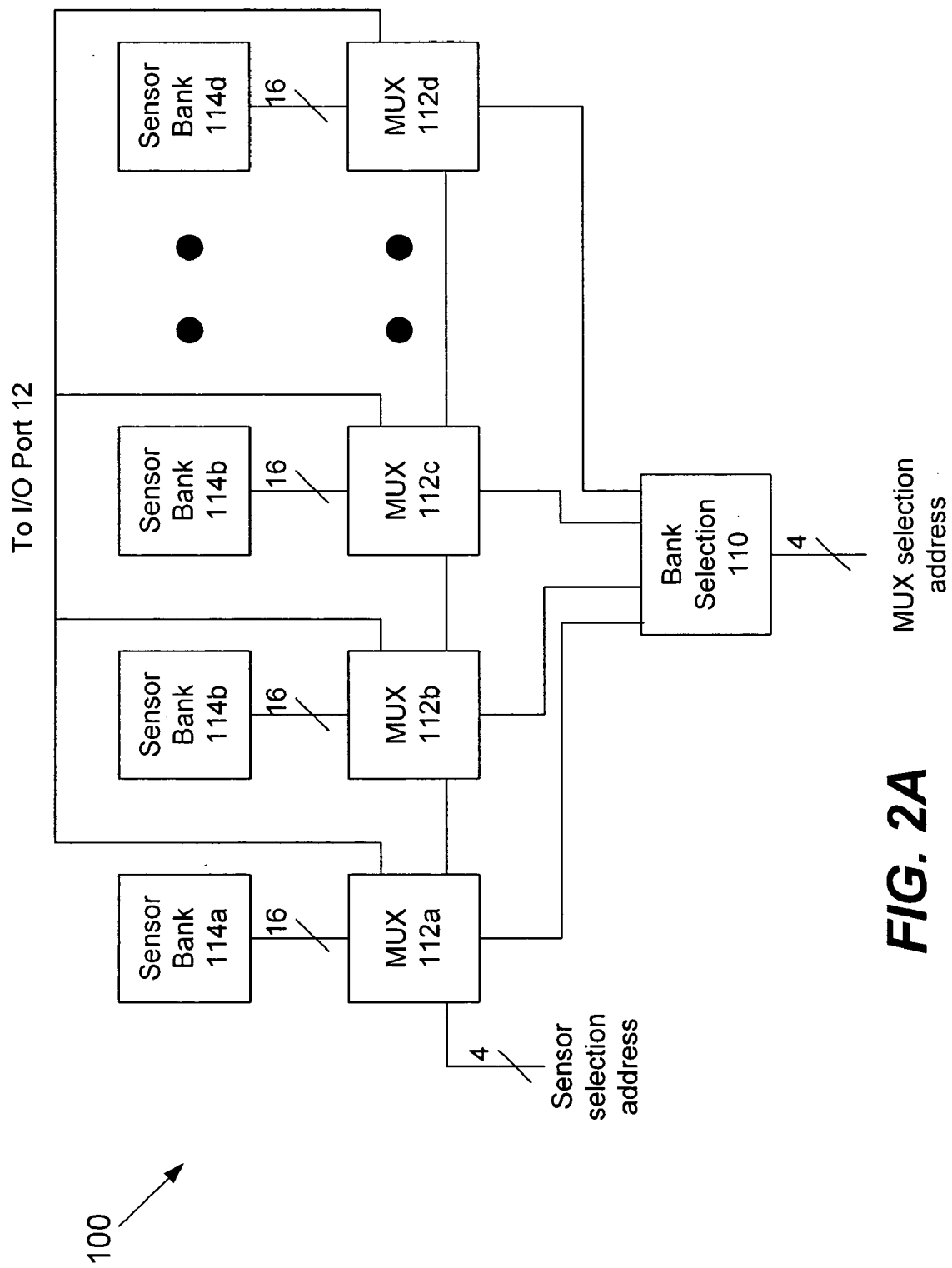
FIG. 2A illustrates sensor interface circuitry that may be used in the sensing system of FIG. 1 in accordance with some embodiments of the present invention.

Turning now to FIG. 2A, the strip 2 has sensors 4 disposed thereon at spaced locations. According to some embodiments of the present invention, the sensors 4 are configured so that a substantially continuous distribution of pressure or nip width across the roll may be determined. For example, a strip 2 having an active cross-machine length of up to about 10 meters may be constructed so as to have up to 256 sensors or sensing cells. These 256 sensors may be arranged as 16 banks containing 16 sensors each. Advantageously, the strip 2 may include sensor interface circuitry 100 that permits the computer 18 to address the individual sensors and obtain data therefrom.

As shown in FIG. 2A, the sensor interface circuitry 100 comprises a bank selection circuit 110 that is coupled to multiplexer circuits 112a, 112b, 112c, and 112d that are respectively coupled to the sensor banks 114a, 114b, 114c, and 114d. In the case of the above example, there would be 16 sensor banks each comprising 16 sensors and 16 multiplexer circuits respectively coupled to the 16 sensor banks. Thus, to select a particular sensor to obtain a pressure and/or nip width measurement therefrom, a four-bit multiplexer selection address may be provided to the bank selection circuit 110 to enable the multiplexer 112a, 112b, 112c, and 112d circuit associated with the particular sensor bank 114a, 114b, 114c, and 114d containing the desired sensor. A four-bit sensor selection address may be applied to the multiplexer circuits 112a, 112b, 112c, and 112d in parallel with only one of the multiplexer circuits 112a, 112b, 112c, and 112d being enabled via the bank selection circuit 110. The enabled multiplexer circuit outputs the data from one of the 16 sensors contained on the sensor bank coupled to the enabled multiplexer circuit based on the four-bit sensor selection address. It will be understood that the number of sensors 4, sensor banks 114a, 114b, 114c, and 114d, and multiplexer circuits 112a, 112b, 112c, and 112d may vary along with the number of bit lines used to address the sensor banks and/or sensors based on the sensor size, roll size, and other factors in accordance with various embodiments of the present invention. It will also be understood that the number of lines used for the sensor selection address and/or the multiplexer selection address may be reduced if serial addressing circuitry is used instead of processing these addresses in parallel.

Advantageously, the sensor interface circuitry 100 of FIG. 2A may use only 12 lines for a 256 sensor configuration in accordance with some embodiments of the present invention. These 12 lines include 8 lines for the multiplexer selection address and sensor selection address, along with a power and ground lines for the circuitry 100, a line to apply a voltage to the sensors 4, and a common output line to the input/output port 12. As discussed above, the number of lines may be reduced further if serial addressing circuitry is used to process the sensor selection address and/or the multiplexer selection address. The sensor interface circuitry 100 including the sensor banks may be encapsulated in the strip 2 through lamination to keep the circuitry protected from water. In other embodiments, the sensor interface circuitry 100 may be attached to the strip near each of the sensor banks 114a, 114b, 114c, and 114d, for example.

Figure 2B:
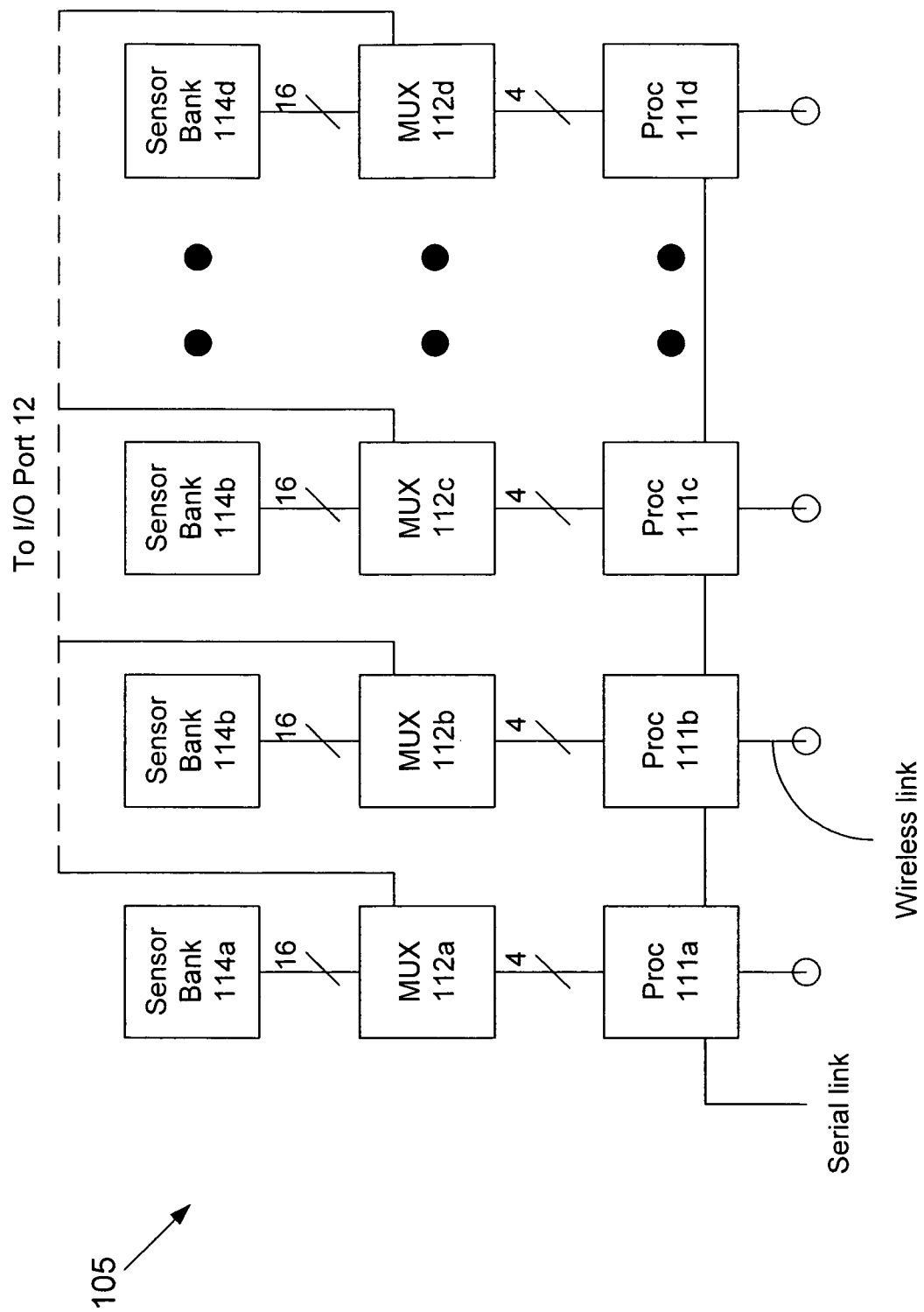
FIG. 2B illustrates sensor interface circuitry that may be used in the sensing system of FIG. 1 in accordance with further embodiments of the present invention.

Referring to FIG. 2B, sensor interface circuitry 105, in accordance with further embodiments of the present invention, is illustrated. The sensor interface circuitry comprises sensor banks 114a, 114b, 114c, and 114d and multiplexer circuits 112a, 112b, 112c, and 112d similar to that discussed above with respect to FIG. 2A. The sensor interface circuitry uses processors 111a, 111b, 111c, and 111d to control the multiplexer circuits 112a, 112b, 112c, and 112d and select sensor channels. As shown in FIG. 2B, the processors 111a, 111b, 111c, and 111d are connected to a serial link over which a multiplexer selection address may be communicated to allow selection of one or more of the multiplexer circuits 112a, 112b, 112c, and 112d. The processors 111a, 111b, 111c, and 111d may drive the multiplexer circuits 112a, 112b, 112c, and 112d with four bit signals to select sensor channels from the respective sensor banks 114a, 114b, 114c, and 114d. The processors 111a, 111b, 111c, and 111d may enable the multiplexer circuits 112a, 112b, 112c, and 112 in parallel to obtain the sensor signals from the sensor banks or may enable the multiplexer circuits 112a, 112b, 112c, and 112 in serial fashion. The processors 111a, 111b, 111c, and 111d may also store the sensor data locally for communication back to the computer 18. The processors 111a, 111b, 111c, and 111d may be microprocessors, embedded controllers, embedded processors, and/or microcontrollers in accordance with some embodiments of the present invention. Exemplary microcontrollers include the PIC line sold by MicroChip (www.microchip.com) and variants of the Intel 8051 microcontrollers.

The outputs of the sensors may be provided to the I/O port 12 for communication back to the computer 18 in some embodiments. In other embodiments, the outputs of the sensors may be provided to processors 111a, 111b, 111c, and 111d, which may use a serial communication protocol, such as RS485 to communicate with the computer 18 or, alternatively, another serial protocol, such as RS232. Wireless and customer protocols may also be used. As shown in FIG. 2B, a wireless transmitter may be associated with each sensor bank to communicate sensor data back to the computer 18. In a wireless system, each bank may have its own power source, such as a battery, or power can be wired directly. The processors 111a, 111b, 111c, and 111d may also store and/or process calibration information for its associated bank. The electronics 10 may also be located on each bank.

In other embodiments, one or more temperature sensors may be associated with the sensor banks 114a, 114b, 114c, and 114d or sensors to improve temperature compensation when calculating the nip width. In accordance with various embodiments of the present invention, a temperature sensor may be associated with each bank and/or sensor, or, alternatively, one or two sensors may be used to obtain an average temperature that may be used in temperature compensation when calculating the nip width.

Figure 3A:
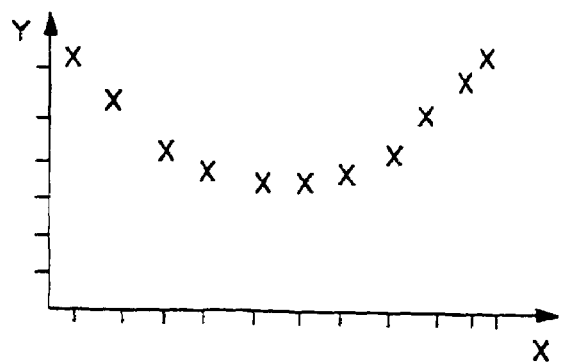
FIG. 3A illustrates a graphical display of the nip width distribution measured in a nip press in accordance with some embodiments of the present invention.
Figure 3B:
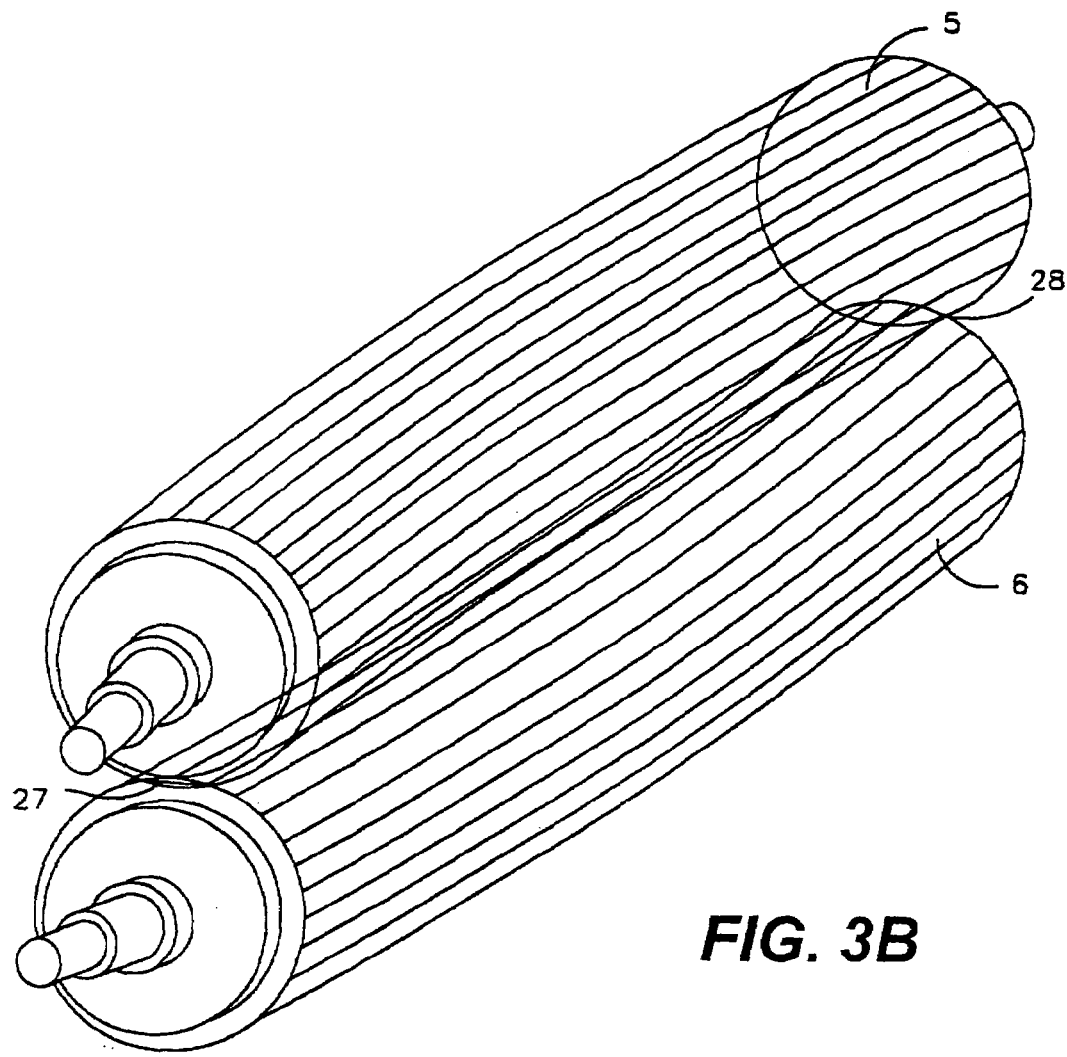
FIG. 3B illustrates the sensing strip in a nip press corresponding to the graphical display of FIG. 3A.

FIG. 3A provides a graphical representation of the nip width distribution for the rolls 5, 6 of FIG. 3B. As can be seen, the ends 27, 28 of the rolls are loaded move heavily than the center and the corresponding nip widths are greater on the ends. This loading distribution is commonly called "undercrowned," indicating that the crown is too small for the journal loading. A uniform nip width distribution/pressure profile may be achieved by increasing the crown or by decreasing the journal loads.

Operations of the sensing system 1 of FIG. 1, according to some embodiments of the present invention, will now be described. The sensor strip 2 is placed between two rolls leaving the unused portion in a coiled configuration at the end of the roll 5. Roll 6 is then loaded against roll 5, which has the strip 2 thereon. After the rolls are loaded to the prescribed journal forces, usually measured by air bag pressures, the sensor strip 2 readings are acquired, as discussed above.

Another approach would be to load the rolls at the prescribed journal forces, and then feed the sensor strip 2 through the nip. The placement of the strip 2 may be achieved through a robotic arm or other automated equipment. In addition, the strip 2 could be attached lengthwise to one of the rolls or could be carried by the felt or web. The sensor readings would be acquired as the sensor passes through the nip.

At a predetermined, or at an operator-requested time, the computer 18 communicates with the bidirectional transmitter 14, which further communicates with the input/output port 12. The multiplexer 18 then cycles through the sensors 4 via the sensor interface circuitry 100 of FIG. 2A or 105 of FIG. 2B, which is disposed on the strip 2, to obtain signals through the associated electronics 10, which signals are indicative of the pressure and/or nip width being sensed by the sensors 4. The input/output port 12 then communicates with the transmitter 14 to send the signals to the signal conditioner 16 for delivery back to the computer 18 where the determination of the pressure and/or nip width values takes place. The computer 18 then causes a numeric or graphical output to appear on the display 20, alerting the operator of the pressure distribution or nip width in the static nip press. Optionally, the computer 18 and/or transmitter 14 can communicate pressure-related or nip width-related signals to the control system 22. In response to such signals, the control system 22 can then initiate crown correction to remedy any irregularities in the pressure sensed.

The sensing system, according to some embodiments of the present invention, may provide the operator with the ability to determine the pressure and/or nip width profile of a roll in one or more nips so as to diagnose the presence of unevenly applied roll forces. The various graphical representations may enable the operator to determine the pressure being applied, the location on the strip being indicative of the location along the length of the rolls, and whether or not it is abnormal. The strip may contain numerous sensors so as to provide a substantially continuous profile of pressure and/or nip-width along the length of the roll. Moreover, the strip may include sensor interface circuitry to facilitate acquisition of measurements from the sensors on the strip. Corrective measures may be initiated in response to unevenly applied forces.

In concluding the detailed description, it should be noted that many variations and modifications can be made to the preferred embodiments without substantially departing from the principles of the present invention. All such variations and modifications are intended to be included herein within the scope of the present invention, as set forth in the following claims.

That which is claimed:

1. A system for determining characteristics of two rolls configured in a nip press, comprising:
   a strip configured to be placed in the nip press;
   a plurality of sensors embedded in the strip that is configured to generate signals representative of the pressure and/or the nip width between the two rolls, the plurality of sensors being configured in a plurality of sensor banks;
   interface circuitry that facilitates addressing of individual ones of the plurality of sensors via a data processing system, the interface circuitry comprising a plurality of multiplexer circuits respectively coupled to the plurality of sensor banks, each of the multiplexer circuits being responsive to a sensor address to select an output signal of one sensor contained on the respective sensor bank coupled thereto; and
   a plurality of processors respectively coupled to the plurality of multiplexer circuits that is responsive to a multiplexer selection address to selectively enable one of the plurality of multiplexer circuits;
   wherein the plurality of sensors embedded in the strip that are configured to generate signals provide a substantially continuous representation of the pressure and/or the nip width along a length of the two rolls.

2. The system of claim 1, wherein the interface circuitry is embedded in the strip.

3. The system of claim 1, wherein the interface circuitry is attached to the strip.

4. The system of claim 1, further comprising:
   a bank selection circuit that is coupled to the plurality of multiptexer circuits and is responsive to a multiplexer selection address to selectively enable one of the plurality of multiplexer circuits.

5. The system of claim 1, further comprising:
   a data processing system configured to process the signals and calculate values representative of the signals.

6. The system of claim 5, further comprising:
   a display coupled to the data processing system that is configured to provide a visual representation of the values.

7. The system of claim 5, wherein the data processing system is configured to calculate measurements of nip width based on the signals.

8. The system of claim 7, wherein the data processing system is configured to calculate measurements of nip width based on the signals at predetermined times.

9. The system of claim 5, further comprising:
   a wireless transmitter that is configured to communicate the signals to the data processing system.

10. The system of claim 9, wherein the plurality of sensors is configured in a plurality of sensor banks, the system further comprising:
    a plurality of wireless transmitters associated with the plurality of sensor banks, respectively.

11. The system of claim 1, further comprising:
a control system that is communicatively coupled to the plurality of sensors and is configured to initiate corrective measures for the nip press responsive to the signals.

12. The system of claim 1, further comprising:
at least one temperature sensor associated with the plurality of sensors.

13. A system for determining characteristics of two rolls configured in a nip press, comprising:
a strip configured to be placed in the nip press;
a plurality of sensors embedded in the strip that is configured to generate signals representative of the pressure and/or the nip width between the two rolls, the plurality of sensors being configured in a plurality of sensor banks;
interface circuitry that facilitates addressing of individual ones of the plurality of sensors via a data processing system, the interface circuitry comprising a plurality of multiplexer circuits respectively coupled to the plurality of sensor banks, each of the multiplexer circuits being responsive to a sensor address to select an output signal of one sensor contained on the respective sensor bank coupled thereto; and
a plurality of processors respectively coupled to the plurality of multiplexer circuits that is responsive to a multiplexer selection address to enable the plurality of multiplexer circuits in parallel;
wherein the plurality of sensors embedded in the strip that are configured to generate signals provide a substantially continuous representation of the pressure and/or the nip width along a length of the two rolls.

14. The system of claim 13, wherein the interface circuitry is embedded in the strip.

15. The system of claim 13, wherein the interface circuitry is attached to the strip.

16. The system of claim 13, further comprising:
a bank selection circuit that is coupled to the plurality of multiplexer circuits and is responsive to a multiplexer selection address to selectively enable one of the plurality of multiplexer circuits.

17. The system of claim 13, further comprising:
a control system that is communicatively coupled to the plurality of sensors and is configured to initiate corrective measures for the nip press responsive to the signals.

18. A method for determining characteristics of two rolls configured in a nip press, comprising:
placing a strip in the nip press, the strip comprising a plurality of sensors embedded in the strip that is configured to generate signals representative of the pressure and/or the nip width between the two rolls and interface circuitry that facilitates addressing of individual ones of the plurality of sensors via a data processing system, the plurality of sensors being configured in a plurality of sensor banks and the interface circuitry comprising a plurality of multiplexer circuits respectively coupled to the plurality of sensor banks and a plurality of processors respectively coupled to the plurality of multiplexer circuits;
using the data processing system to determine characteristics of the two rolls based on the signals;
generating signals that provide a substantially continuous representation of the pressure and/or the nip width along a length of the two rolls;
enabling one of the plurality of multiplexer circuits using one of the plurality of processors responsive to a multiplexer selection address; and
selecting the output signal of one sensor contained on the sensor bank coupled to the enabled one of the plurality of multiplexer circuits responsive to a sensor address.

19. The method of claim 18, wherein the interface circuitry is embedded in the strip.

20. The method of claim 18, wherein the interface circuitry is attached to the strip.

21. The method of claim 18, wherein the plurality of sensors is configured in a plurality of sensor banks, and wherein the interface circuitry comprises a plurality of multiplexer circuits respectively coupled to the plurality of sensor bans and a bank selection circuit that is coupled to the plurality of multiplexer circuits, the method further comprising:
enabling one of the plurality of multiplexer circuits using the bank selection circuit responsive to a multiplexer selection address; and
selecting the output signal of one sensor contained on the sensor bank coupled to the enabled one of the plurality of multiplexer circuits responsive to a sensor address.

22. The method of claim 18, further comprising:
calculating values representative of the signals using a data processing system.

23. The method of claim 22, further comprising:
displaying a visual representation of the values.

24. The method of claim 22, further comprising:
calculating measurements of nip width based on the signals.

25. The method of claim 24, further comprising:
calculating measurements of nip width based on the signals at predetermined times.

26. The method of claim 22, further comprising:
wirelessly communicating the signals to the data processing system.

27. The method of claim 18, further comprising:
initiating corrective measures for the nip press responsive to the signals.

28. A method for determining characteristics of two rolls configured in a nip press, comprising:
placing a strip in the nip press, the strip comprising a plurality of sensors embedded in the strip that is configured to generate signals representative of the pressure and/or the nip width between the two rolls and interface circuitry that facilitates addressing of individual ones of the plurality of sensors via a data processing system, the plurality of sensors being configured in a plurality of sensor banks and the interface circuitry comprising a plurality of multiplexer circuits respectively coupled to the plurality of sensor banks and a plurality of processors respectively coupled to the plurality of multiplexer circuits;
using the data processing system to determine characteristics of the two rolls based on the signals;
generating signals that provide a substantially continuous representation of the pressure and/or the nip width along a length of the two rolls;
enabling the plurality of multiplexer circuits in parallel using the plurality of processors responsive to a multiplexer selection address; and
selecting the output signals of sensors contained on the sensor banks sensor addresses.

29. The method of claim 28, wherein the interface circuitry is embedded in the strip.

30. The method of claim 28, wherein the interface circuitry is attached to the strip.

31. The method of claim 28, wherein the plurality of sensors is configured in a plurality of sensor banks, and wherein the interface circuitry comprises a plurality of multiplexer circuits respectively coupled to the plurality of sensor bans and a bank selection circuit that is coupled to the plurality of multiplexer circuits, the method further comprising:
   enabling one of the plurality of multiplexer circuits using the bank selection circuit responsive to a multiplexer selection address; and
   selecting the output signal of one sensor contained on the sensor bank coupled to the enabled one of the plurality of multiplexer circuits responsive to a sensor address.

32. A strip for use in a nip press between two rolls, comprising:
   a plurality of sensors embedded in the strip that is configured to generate signals representative of the pressure and/or the nip width between the two rolls, the plurality of sensors is configured in a plurality of sensor banks;
   interface circuitry that facilitates addressing of individual ones of the plurality of sensors via a data processing system, the interface circuitry comprising a plurality of multiplexer circuits respectively coupled to the plurality of sensor banks, each of the multiplexer circuits being responsive to a sensor address to select an output signal of one sensor contained on the respective sensor bank coupled thereto; and
   a plurality of processors respectively coupled to the plurality of multiplexer circuits that is responsive to a multiplexer selection address to selectively enable one of the plurality of multiplexer circuits;
   wherein the plurality of sensors embedded in the strip that are configured to generate signals provide a substantially continuous representation of the pressure and/or the nip width along a length of the two rolls;
   a plurality of processors respectively coupled to the plurality of multiplexer circuits that is responsive to a multiplexer selection address to selectively enable one of the plurality of multiplexer circuits.

33. The strip of claim 32, wherein the interface circuitry is embedded in the strip.

34. The strip of claim 32, wherein the interface circuitry is attached to the strip.

35. The strip of claim 32, further comprising:
   a bank selection circuit that is coupled to the plurality of multiplexer circuits and is responsive to a multiplexer selection address to selectively enable one of the plurality of multiplexer circuits.

* * * * *